(No Model.) 7 Sheets—Sheet 1.

N. W. HOLT.
PROCESS OF SEPARATING MATERIALS OF DIFFERENT SPECIFIC GRAVITIES.

No. 525,048. Patented Aug. 28, 1894.

(No Model.) 7 Sheets—Sheet 2.
N. W. HOLT.
PROCESS OF SEPARATING MATERIALS OF DIFFERENT SPECIFIC GRAVITIES.
No. 525,048. Patented Aug. 28, 1894.

Fig. 4

Witnesses: Inventor (No Model.) 7 Sheets—Sheet 3.
N. W. HOLT.
PROCESS OF SEPARATING MATERIALS OF DIFFERENT SPECIFIC GRAVITIES.

No. 525,048. Patented Aug. 28, 1894.

(No Model.)  7 Sheets—Sheet 4.

N. W. HOLT.
PROCESS OF SEPARATING MATERIALS OF DIFFERENT SPECIFIC GRAVITIES.

No. 525,048.  Patented Aug. 28, 1894.

Witnesses:
J. B. McGirr.
J. C. Turner

Inventor:
Noah W. Holt
by Doubleday & Bliss
attys.

(No Model.) 7 Sheets—Sheet 6.
N. W. HOLT.
PROCESS OF SEPARATING MATERIALS OF DIFFERENT SPECIFIC GRAVITIES.
No. 525,048. Patented Aug. 28, 1894.

(No Model.) 7 Sheets—Sheet 7.

N. W. HOLT.
PROCESS OF SEPARATING MATERIALS OF DIFFERENT SPECIFIC GRAVITIES.

No. 525,048. Patented Aug. 28, 1894.

UNITED STATES PATENT OFFICE.

NOAH WILLIAM HOLT, OF MANCHESTER, MICHIGAN.

PROCESS OF SEPARATING MATERIALS OF DIFFERENT SPECIFIC GRAVITIES.

SPECIFICATION forming part of Letters Patent No. 525,048, dated August 28, 1894.

Application filed April 27, 1888. Serial No. 272,033. (No specimens.)

*To all whom it may concern:*

Be it known that I, NOAH WILLIAM HOLT, a citizen of the United States, residing at Manchester, in the county of Washtenaw and State of Michigan, have invented certain new and useful Improvements in Processes of Separating Materials of Different Specific Gravities, of which the following is a specification, reference being had therein to the accompanying drawings.

In the present advanced condition of milling it is well understood that in order to produce the best results, both as regards the highest quality of flour and the largest yield from a given amount of wheat, it is necessary during various stages in the process of gradual reduction, to separate from the flour producing part of the wheat the exceedingly fine pulverulent impurities the particles of which are so minute that prior to the date of my invention no means had been known whereby they could be economically taken out. Such purification can be effectually performed only by an air current which is free from such particles of refuse as are floating, in quite large quantities, in the air within a mill under ordinary circumstances, particularly when the atmosphere surrounding the mill is more or less charged with impurities, such, for instance, as soot, coal-dust, dust from the streets, and other deleterious substances which abound in most cities and also in the rural districts in many parts of the country. It has been customary to discharge the dust-laden air current from an aspirator, as gravity separators using air currents are called, into capacious dust rooms or settling chambers or into some sort of a dust collector, air being supplied to the aspirator directly from the body of air inclosed within the walls of the mill. But this has been found seriously objectionable because it resulted in drawing into the machine, and into contact with the material being treated, large quantities of impurities which were floating in the air surrounding the aspirator. Machines have also been patented in which the dust-laden air current was passed through a filter cloth to remove impurities which had been taken from material while passing over and through a screen, the air being returned from the filter to the machine below the screen. So, also, machines have been patented in which an air current traveled round and round passing through contracted throats and enlarged air chambers intended to operate as dead air spaces to effect therein a deposition of material taken up by the air.

In all prior constructions use has been made of appliances which produce diametrically opposite results at different stages of the process; that is to say, the movements of the air current have been such that while passing through one machine they would subtract lighter portions of material from the relatively heavier, and when passing through another machine part of the material would be either intercepted by a filter cloth or deposited in a dead air chamber, by reason of a slowing up of the speed of the air current thus permitting material to fall out of the current by the action of gravity simply and in a downward direction the air current meantime moving in a direction substantially at right angles thereto.

My invention consists, essentially, in subjecting a mingled mass of middlings or flour and pulverulent impurities to the separating and purifying action of a current of purified air which is moving in a direction substantially opposite to the direction in which the heavier particles of the mass are moving, and subsequently subjecting the impurities thus extracted by the air current to centrifugal action while moving in substantially the same direction as that in which the air current is moving in a vortex, whereby the very fine particles are removed from the air current which is thus purified, the air being passed continuously round and round through the material to be purified and through the vortex.

In carrying out my invention I propose to use a funnel shaped vortex chamber for removing from the dust-laden air current the fine impurities suspended therein and thus preparing such air current for introduction into and through the falling material within the aspirator, which is to be connected with the vortex chamber by a continuous air trunk, so as to isolate the air current from the surrounding atmosphere of the mill. I propose to employ some of the well known forms of aspirator such as will be best adapted to effect the requisite separations. And under some circumstances I propose to use a second concentric funnel shaped shell within the vortex chamber in order to make an additional separation therein. Under other circumstances, however, where fewer separations are desirable I propose to arrange the aspirator within the same wall or shell which incloses the vortex chamber; thereby making a very compact machine, reducing the cost of manufacture and the operating space.

According to another mode, I propose for convenience and economy of manufacture as well as in space occupied, to arrange all the machines or appliances within a common inclosed wall or casing; and when thus arranged, I prefer to make use of the inclosing casing as one wall of one of the chambers of the machine and to arrange one of the machines laterally within the other. Under either mode of working, I propose to use an aspirator, either one of the well known forms in common use in flouring mills, or of a form which I have invented for this purpose and which I have found to be well adapted therefor. I also propose to use a separating chamber wherein use is made of centrifugal action for separating the material from an air current and dividing it into two grades when desired.

In the drawings, I have shown one form of aspirator which may be conveniently arranged and operated within such separating chamber; and one form which cannot be practically or at least advantageously, thus arranged. And so also, I have shown one form of centrifugal separating chamber within which neither of the forms shown of aspirator can be conveniently placed and operated.

Having thus set forth the nature of my invention, I will proceed to describe machinery which I propose to employ in carrying my invention into effect.

Referring to the drawings.

Like reference letters indicate like parts in all the figures.

Figures 1, 2, 3:
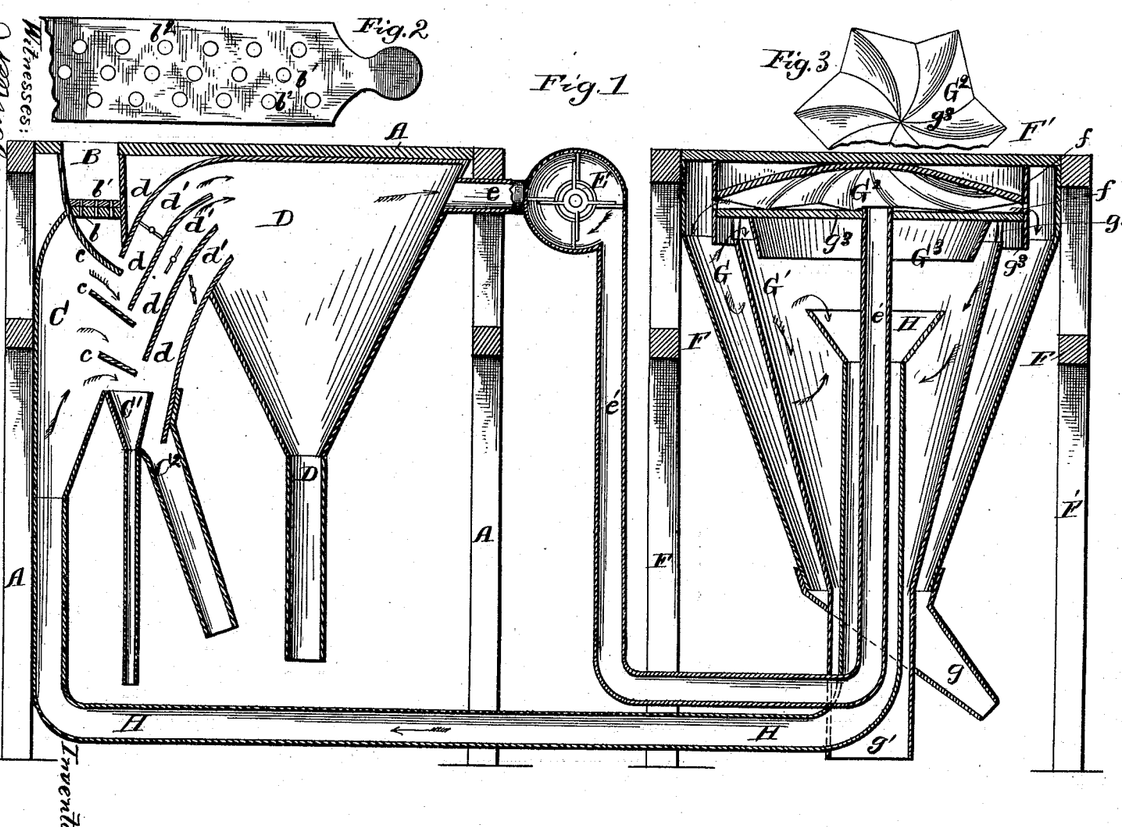
Figure 1 is a vertical central section of two machines which I propose to use.
Fig. 2 is a detailed view enlarged of one of the parts.
Fig. 3 is a detailed partial view reduced in size of one of the parts.

Referring to Figs. 1, 2, and 3, A A represent generally the framework and casing of one of the machines.

B is a feed hopper consisting essentially of two sides, two ends and a bottom $b$ which is provided with a series of openings preferably circular in cross section as will be explained.

$b'$ (see Figs. 1 and 2) is a sliding gage plate having a series of openings, preferably round in cross section as indicated at $b^2$, these openings corresponding substantially in size and form to the openings $b$ in the bottom of the hopper, so that by moving this gage plate endwise, all of its openings may be made to register exactly with the openings at the bottom of the hopper so that material may be delivered in a series of small streams, and by an examination of these figures, it will be seen that the arrangement of holes is such that the material is delivered with practical uniformity throughout the entire space below the bottom of the hopper.

C is an air chamber or trunk arranged below the hopper.

$cc$ are a series of inclined deflecting plates or shelves.

$dd$ are a series of oppositely inclined deflecting plates having their lower edges at short distances from the lower edges of the deflecting plates $cc$.

C' is a hopper and spout below the deflecting plates.

$C^2$ is another spout by the side of the spout C'.

D is an air chamber preferably hopper bottomed, and opening into a spout D'.

$d'd'$ are a series of valves or dampers in the throats or air passages which are formed between the deflecting plates $dd$. The shanks or shafts of these dampers preferably project through the walls of the machine and are provided with adjusting devices of some common well known sort whereby the valves may be adjusted and locked in position.

E is a fan connected with the chamber D by a spout $e$ leading to the eye of the fan.

At the right hand end of Fig. 1 is represented another machine of which F F represent generally the frame work and F' a top or deck.

G is a shell or casing arranged below the deck F'. Preferably I make the upper part of this shell cylindrical and its lower part funnel shaped, terminating at the bottom in an adjustable spout $g$.

G' is an inner funnel shaped shell arranged substantially concentric to the outer one G and terminating at its bottom in a discharge spout $g'$.

$G^2$ is a deflector made preferably in the form indicated in Figs. 1 and 3 and suspended, with its concave side downward, below the deck F' to which it may be attached for support. The outer edge is shown scalloped and is arranged in close proximity to a flat disk which closes the upper end side of a short shell or ring $G^3$.

$g^3$ is a ring or flange of somewhat greater diameter than is the ring $G^3$ with which it is connected by a head or disk $g^4$. This head or disk $g^4$ together with the rings $G^3$ $g^3$ may be attached to the lower edge of the deflector G² ; or these parts may be suspended from the deck F' by a ring or hoop f, which as indicated in Fig. 3, may be made in one and the same piece with the ring g³ and provided with a series of openings f'. The series of links or ties may be connected at their lower ends to the ring g³ and at their upper ends to the under side of the deck.

H is an air pipe, preferably flaring at its upper end as shown in Fig. 1, and extending from the air chamber C to a point within the shell G'; the mouth of the fan being also connected by an air pipe e' with the interior of the shell G'. By preference, I project this air pipe e' through the air pipe H with its upper end in close proximity to the deflector G². This deflector is preferably provided on its under side with ribs g⁵ projecting in curved lines from the center outward, whereby the air which, after leaving the air pipe, e', impinges upon the under surface of the deflector, is adjustable through the opening or openings between the deflector and the disk g⁴ with a whirling motion.

These machines may be operated as follows in working my processes: Material being fed in through the hopper B, is discharged in a series of small streams in such manner that it passes over the lower edge of the upper one of the deflectors c, in a thin stream or sheet extending practically the entire width of the machine, and passes thence in a zigzag course from one deflector to the next below it, and so on. The fan being put in rapid motion by a belt from any suitable motor, moves a current of air through the throats between these deflectors, carrying with it more or less of the lighter portions of the material; such material as slides over the lower deflector c being divided into three grades, the heavier of which falls into the spout C', the next lighter into the spout C² and the third and still lighter part being carried by the air current into the chamber D. As the air current is moving through this chamber D and into the fan, part of the material falls down and out through the spout D'. That part which goes through the fan and air spout e' is discharged into the separating chamber between the shells G G', where, by reason of the whirling movement of the air, the heavier particles are separated by centrifugal action and pass out through spout g. The air current, continuing its movement, as indicated by the arrows in Fig. 3, moves below the lower edge of the ring g³, thence into the chamber inside the shell G' where the work of separation is completed, the finest particles of material going out through the spout g'. The air after being thus freed from material by these repeated separations, enters the air spout H and is conducted back to the air chamber C. I prefer to use machines of this character in working my invention where it is desired to separate the material into four grades exclusive of the fine impurities which are removed from the air current to fit it for being returned to the aspirator. But it is obvious that with material which may be advantageously divided into two grades, having reference to size of granulation, such separation can be made by regulating the air currents in the aspirator by use of the dampers d'; the air being purified for its return as it goes through the vortex chamber, even though nothing but worthless impurities are driven out from the air within either of the shells G, G'.

Referring now to Figs. 4 to 10 inclusive, J J represent generally the framing.

Figure 4:
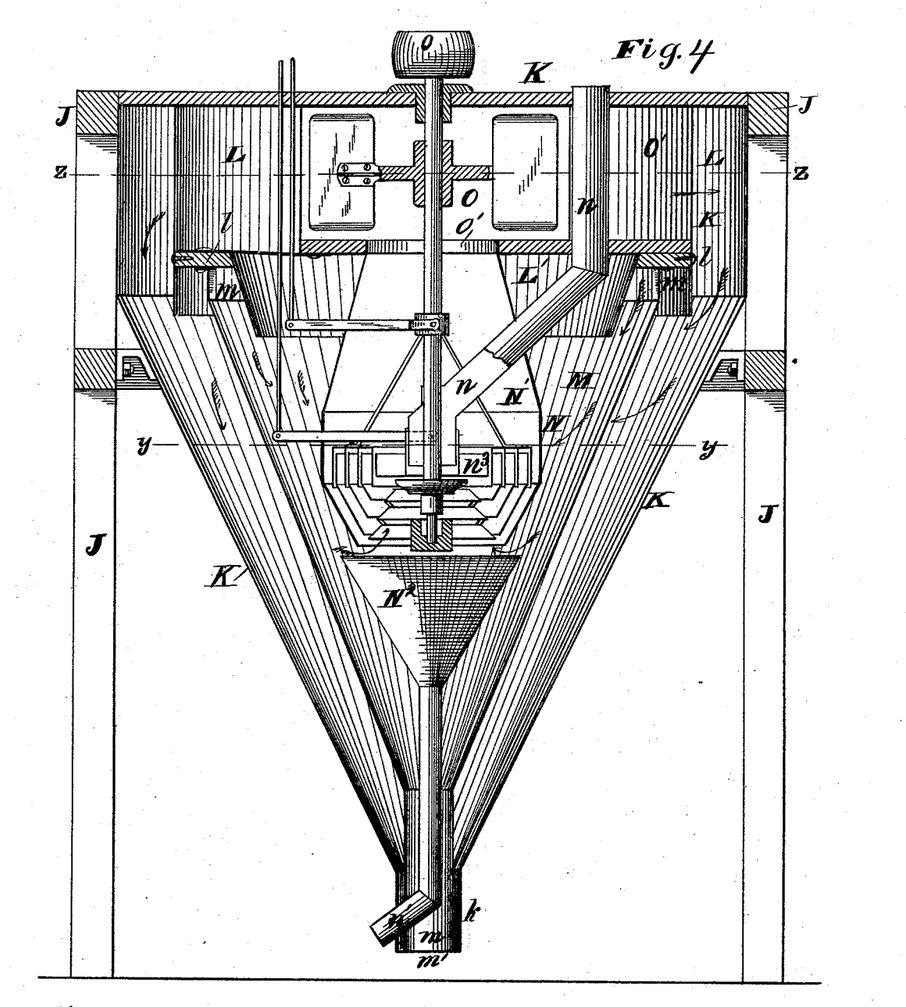
Fig. 4 is a central vertical section on line $xx$ Fig. 5 of one form of combined machine which I propose to use.
Figure 5:
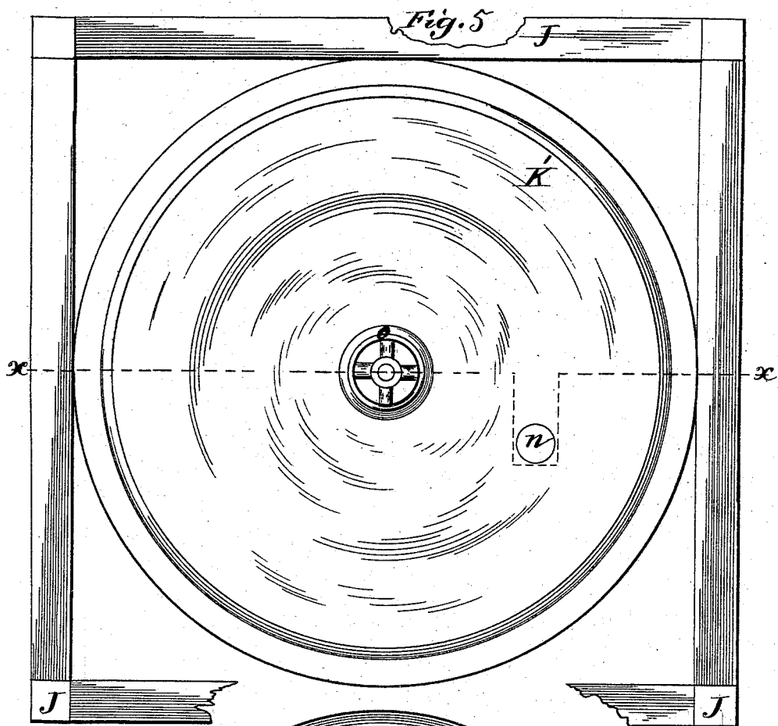
Fig. 5 is a top or plan view of Fig. 4.
Figure 6:
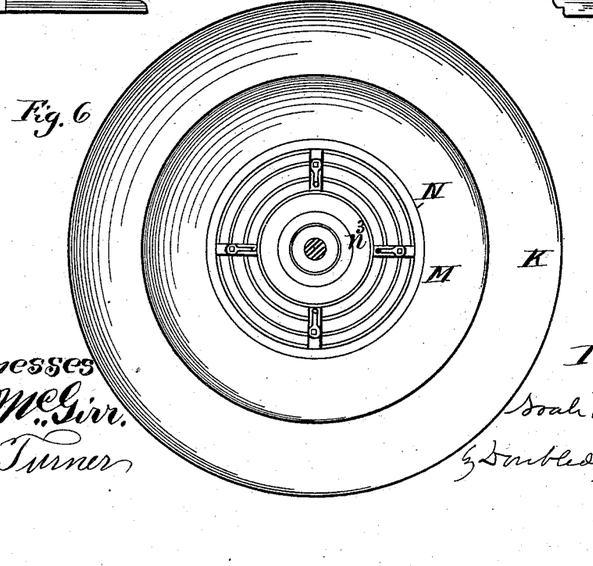
Fig. 6 is a horizontal section on line $yy$ Fig. 4.
Figure 7:
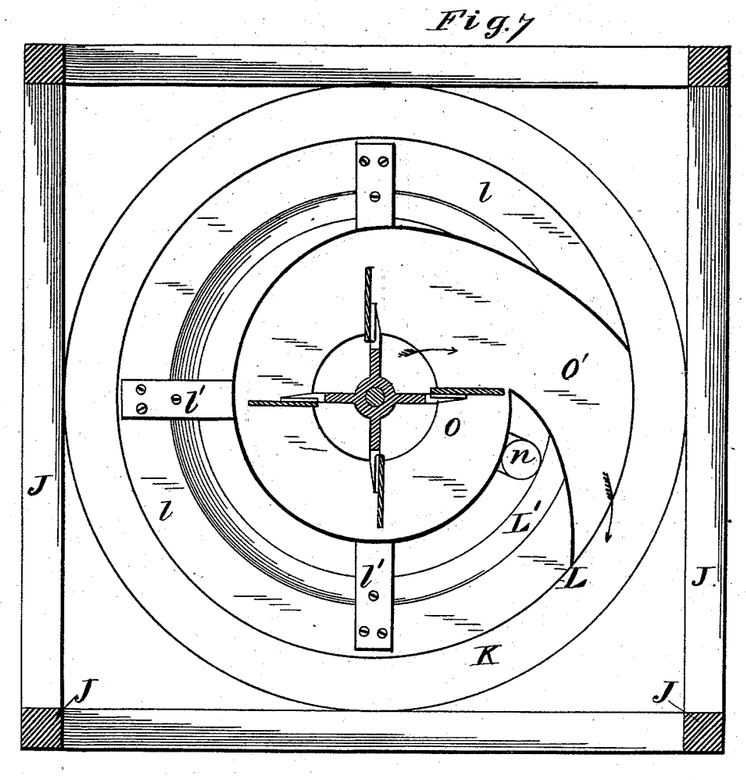
Fig. 7 is a horizontal section on line $zz$ Fig. 4.
Figure 8:
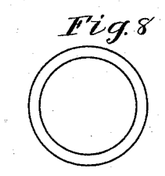
Figs. 8, 9 and 10 are details.
Figure 9:
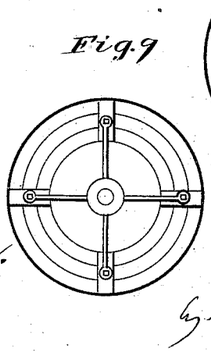
Figure 10:
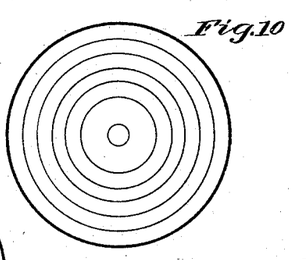

K is an outer shell or casing of which the upper part is cylindrical, the lower part being funnel shaped. K' is the top or deck across the top of this casing and preferably imperforate as hereinafter described.

L is a casing suspended below the deck and of somewhat smaller diameter than the cylindrical section of the shell J.

l is a flange projecting inward from the shell L a short distance above its lower end.

L' is a short funnel shaped section of a shell supported within the flange l.

M is a second funnel shaped shell suspended by links m from the flange l, both these shells K and M having at their lower ends, discharge tubes or pipes k m'.

N N' is the outer shell or casing of an aspirator which is described in detail in my Patent No. 384,950, dated June 19, 1888, to which reference is made for a detailed description, which, therefore, need not be given herein.

N² is a hopper below the aspirator pipe and n is a feed tube, there being a discharge pipe n' at the lower end of the hopper. Below the feed tube is a distributing wheel or disk n³ mounted on the lower end of the shaft of the fan O, all of which parts are described in detail in my said patent.

O' is the mouth of the fan opening into the separating chamber between the shells K, L and M. This arrangement of the aspirator within the inclosing wall of the vortex chamber is one which I prefer to use under many circumstances, particularly when material is of such character that nothing need be taken from it except the very fine impurities, which, however, should be separated from the air in the vortex before the air is returned to the aspirator.

Referring to Figs. 11, 12, 13 and 14, K, L, L', M n N refer to the outer shell, the inner shells, the feed spout, the middle portion of the aspirator casing, which parts are substantially the same as those shown in the last above mentioned figures, and in my patent before mentioned. In this machine, however, the upper part N³ of the aspirator casing instead of connecting with the eye of the fan as in the patent, opens into a chute or throat N⁴ which leads directly into the separating chamber between the shells K, L and M.

Figure 11:
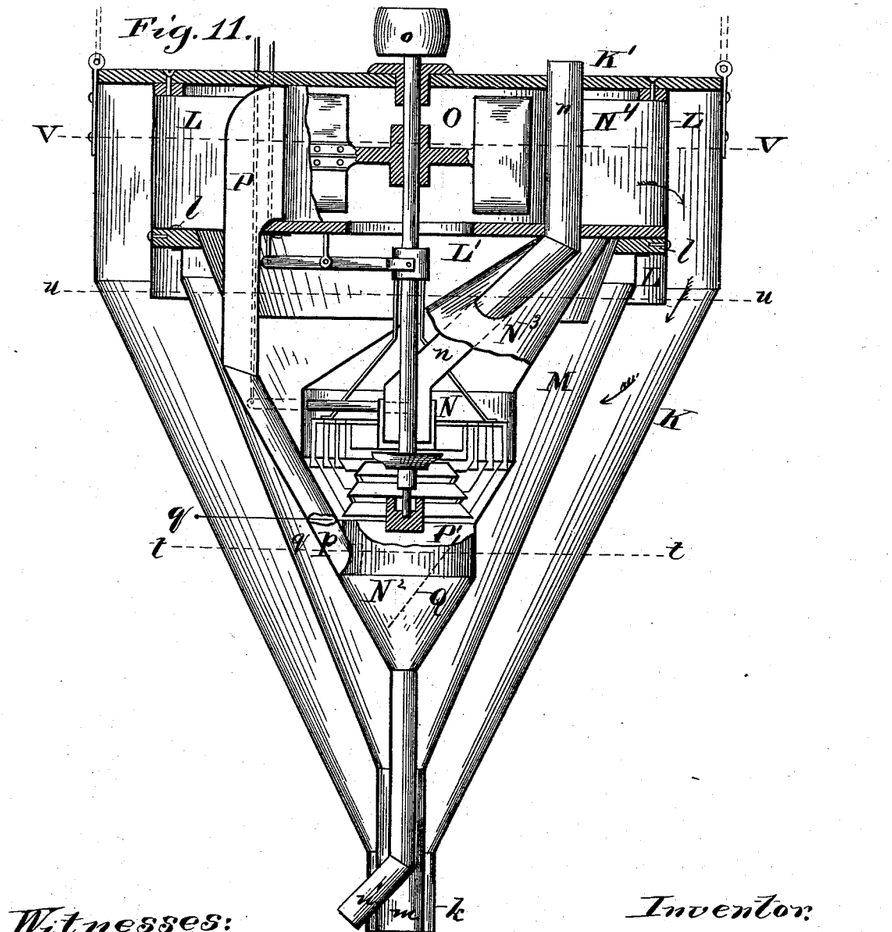
Fig. 11 is a vertical section of another form of machine which I propose to use.
Figure 12:
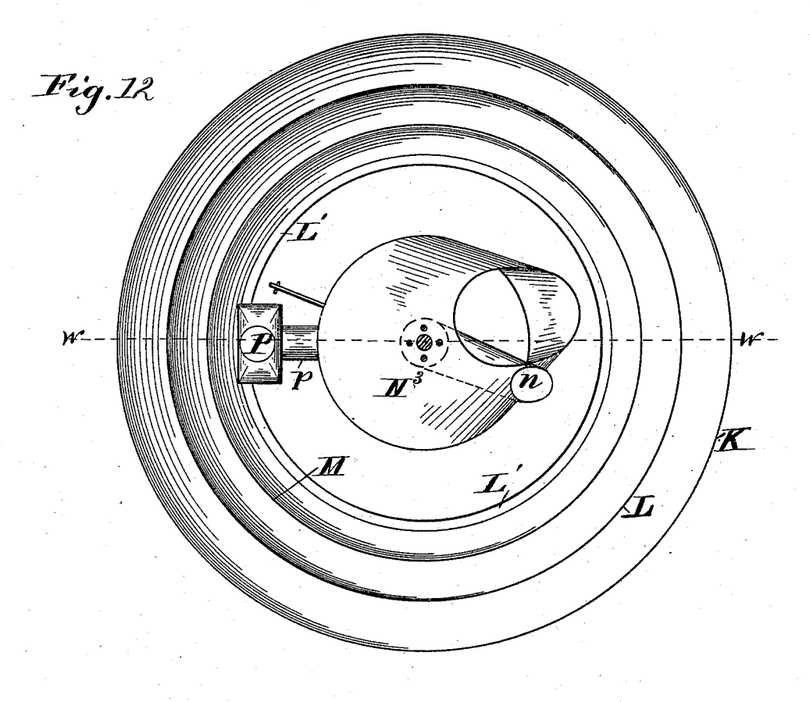
Fig. 12 is a horizontal section on line $uu$ Fig. 11.
Figure 13:
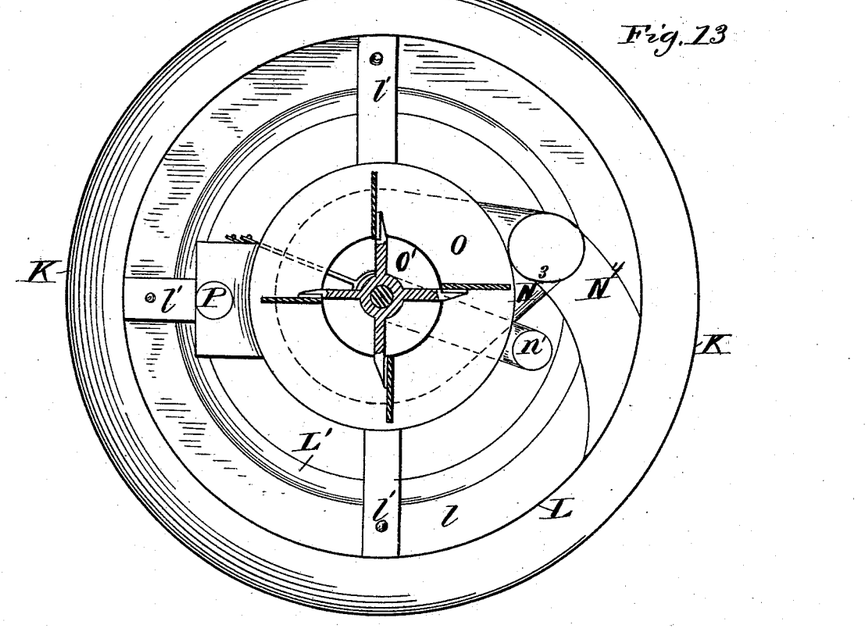
Fig. 13 is a horizontal section on line $vv$ Fig. 11.
Figure 14:
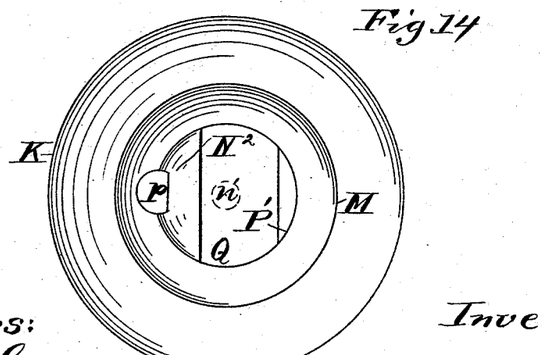
Fig. 14 is a horizontal section on line $tt$ Fig. 11.

P p is a wind trunk or pipe leading from the mouth of the fan to a point below the aspirator. And by preference I interpose a short cylindrical section P' of casing between the upper end of the hopper N² and the lower end of the aspirator casing to insure that the air discharged from the fan shall pass through the aspirator and thence through the throat N⁴ into the separating chamber.

Q is a deflector arranged in an inclined position below the lower end of the air spout P p to assist in directing the air current upward into the aspirator. There is a space between the edge of this deflector and the surrounding casing or funnel to permit material which falls through the aspirator to go down into the discharge spout n' without hinderance. q is a valve or damper, the stem or shank of which projects outward through shells K, M within convenient reach of the operator who can by its use regulate the strength of the blast through the deflector.

Referring to the construction shown in Figs. 4 to 10 inclusive, it will be seen that the aspirator is situated within the chamber in which a separation is effected by centrifugal action. In this machine, the air after passing through the aspirator enters the eye of the fan and is discharged thence through the mouth O' of the fan into the separating chamber between the shells K L M, moving in the direction indicated by the arrows on Fig. 4, into the lower end of the aspirator, thence up through the aspirator and the material discharged into the aspirator from the feed tube or spout n, carrying with it more or less of the lighter materials up into the fan. It will be observed that in this machine there is no trunk leading from the mouth of the fan to the aspirator, the air with its material held in suspension being delivered into the separating chamber; the fan operating by suction by reason of its eye being connected directly with the casing of the aspirator. But in the machine represented in Figs. 11 to 14, the mouth of the fan is connected with the aspirator by means of a trunk or tube; so that the blast enters the lower part of the aspirator, the upper part of the casing of which instead of going to the eye of the fan, as in the other machine just referred to, discharges into the separating chamber. But in working my invention upon, or by means of, either of the three arrangements of machines, the process is substantially the same, in that, among other things, the same body of purified air is caused to travel round and round through substantially the same path, and perform substantially the same function, and in substantially the same way, during its successive passages or movements through each machine, again, the function and mode of operation of each machine employed in working the process differ materially from that of the other machine in conjunction with which it is employed; that is to say, the separation made by the air current in passing through the aspirator at the left hand end of Fig. 1 is effected in part by the direct lifting action of the air current as it passes through the material falling from one inclined deflecting plate to another; in part by the air current carrying part of the material sidewise after it leaves the lowermost plate c so that it falls into the spout C²; in part by the action of gravity causing some of the material to fall out of the air current while passing through the chamber D; while in the machine represented at the right hand end of Fig. 1, the separation is effected principally if not wholly by centrifugal action whereby the air is purified and fitted for use in the aspirator, a mode of operation which does not enter into or in any manner affect the separation which is made within the other machine. Again in the machines shown in the Figs. 4 to 14 inclusive, the only separation which takes place within the aspirator is effected principally, if not wholly, by the lifting action of the air currents as they move in an upward direction. Although when used for separating finely pulverized material, such for instance, as the products of grinding grain, the separation which is effected after the air current has passed through the fan and into the separating chamber, is produced almost wholly by centrifugal action, because the construction and arrangement of parts are such that said air current has imparted to it a whirling motion, thus forming substantially a vortex within the walls of that chamber; yet there is another feature of its operation which under some circumstances, will be found advantageous. It will be observed that owing to the dimensions of the separating chamber, the rate of travel of the air current is greatly reduced soon after it enters therein, so that material which would be taken out from the aspirator by a rapidly moving air current will fall by gravity soon after entering the separating chamber while the separation of lighter material by centrifugal action will take place within the inner funnel shaped shell; as, for instance, when the machine is being used for the grading or cleaning of grain; it being well known that it is frequently desirable to separate shriveled and broken grain from the other very much lighter material including impurities of various sorts, in order that the clean, sound and perfect kernels may go down through the aspirator, the broken and shriveled kernels may go out through a second spout, and the comparatively worthless and impure material may go out through a third spout, it being of course understood that when separating grain the dampers should be opened to produce a very much stronger air current than could be used for separating and purifying flour or middlings. It will of course be understood that grading of grain is analogous to the ordinary operation of screening whereby the grain is fitted to be sent to the smutter or other scouring machine on its way to brushing machinery and thence to the reducing machinery. But such grading of grain constitutes no part of the invention for which protection is herein sought.

What I claim is—

The herein described improvement in the art of separating and purifying flour or middlings, the same consisting in passing through a mass of mingled pulverulent impurities and flour or middlings a current of air from which impurities have been previously removed, the purified air moving against and through the material, subjecting the dust-laden air current to centrifugal action while moving with the air current in a vortex to separate the impurities from the air, and afterward passing the purified air, while isolated from the atmosphere of the mill, through another mass of mingled impurities and flour or middlings, whereby the separation and purification of the flour or middlings is effected through the agency of an air current which has been purified by centrifugal action substantially as set forth.

In testimony whereof I affix my signature in presence of two witnesses.

NOAH WILLIAM HOLT.

Witnesses:
 MYER COHEN,
 B. W. SOMMERS.